(12) United States Patent
Katsushima et al.

(10) Patent No.: US 8,363,432 B2
(45) Date of Patent: Jan. 29, 2013

(54) DC-DC CONVERTER CIRCUIT

(75) Inventors: Hajime Katsushima, Osaka (JP);
Toshikazu Fujiyoshi, Osaka (JP); Kenji Morimoto, Osaka (JP); Hajime Yamamoto, Osaka (JP); Satoshi Yamamura, Osaka (JP)

(73) Assignee: Sansha Electric Manufacturing Co., Ltd., Osaka (JP)

(*) Notice: Subject to any disclaimer, the term of this patent is extended or adjusted under 35 U.S.C. 154(b) by 0 days.

(21) Appl. No.: 13/063,070

(22) PCT Filed: Dec. 16, 2009

(86) PCT No.: PCT/JP2009/070946
§ 371 (c)(1),
(2), (4) Date: Mar. 9, 2011

(87) PCT Pub. No.: WO2011/074081
PCT Pub. Date: Jun. 23, 2011

(65) Prior Publication Data
US 2012/0243263 A1    Sep. 27, 2012

(51) Int. Cl.
*H02M 3/335*    (2006.01)
*H02M 7/538*    (2007.01)

(52) U.S. Cl. ............................. 363/24; 363/17; 363/133

(58) Field of Classification Search .............. 363/16–17, 363/24–26, 97–98, 131–134
See application file for complete search history.

(56) References Cited

U.S. PATENT DOCUMENTS

| | | | | |
|---|---|---|---|---|
| 4,797,630 | A | * | 1/1989 | Brown .......................... 330/264 |
| 7,130,205 | B2 | * | 10/2006 | Peng ............................ 363/140 |
| 2004/0174725 | A1 | | 9/2004 | Fujiyoshi et al. |
| 2008/0025051 | A1 | * | 1/2008 | Leu ................................ 363/20 |

FOREIGN PATENT DOCUMENTS

| | | |
|---|---|---|
| JP | 61-054875 A | 3/1986 |
| JP | 2000-152624 A | 5/2000 |

(Continued)

OTHER PUBLICATIONS

International Search Report for corresponding International Application No. PCT/JP2009/070946 mailed Jan. 19, 2010.

(Continued)

*Primary Examiner* — Matthew Nguyen
*Assistant Examiner* — Nusrat Quddus
(74) *Attorney, Agent, or Firm* — Renner, Otto, Boisselle & Sklar, LLP

(57) ABSTRACT

This DC-DC converter circuit includes: first and second switching elements (S1, S2); an output transformer (T) that includes a first primary winding (P1) connected in series between the positive electrode sides of the first and second switching elements (S1, S2), a second primary winding (P2) connected in series between their negative electrode sides, a secondary winding (S) for obtaining an output voltage, and tertiary windings (n3, n4); a first voltage source (C1), connected between a first connection point at which the first primary winding (P1) is connected to the second switching element (S2) and the first switching element (S1), that applies a voltage to the first switching element via the first primary winding; a second voltage source (C2) connected to locations symmetric with those of the first voltage source (C1); and a control unit (CT) that turns the first and second switching elements (S1, S2) alternatingly ON and OFF, and first and second regeneration snubber circuits (SN1, SN2) for regenerating the charge in snubber capacitors (C3, C4) to the voltage sources (C1, C2); and these regeneration snubber circuits (SN1, SN2) include third and fourth switching elements (S3, S4) driven by the output voltages of the tertiary windings (n3, n4).

4 Claims, 10 Drawing Sheets

FOREIGN PATENT DOCUMENTS

| | | |
|---|---|---|
| JP | 2001-112253 A | 4/2001 |
| JP | 2004-266976 A | 9/2004 |
| JP | 2005-279774 A | 10/2005 |
| JP | 2007-151225 A | 6/2007 |

OTHER PUBLICATIONS

International Search Report for corresponding International Application No. PCT/JP2009/070946 dated Jan. 19, 2010 in English.

* cited by examiner

DC-DC CONVERTER CIRCUIT

TECHNICAL FIELD

The present invention relates to a DC-DC converter circuit of a novel structure, that is different from that of a DC-DC converter circuit of the full bridge type or the half bridge type or the like.

BACKGROUND ART

A DC-DC converter circuit is a combination of an inverter circuit, an output transformer, and a rectification circuit, and inverter circuits that are well known from the prior art are the full bridge type, the half bridge type, and the center tap push-pull type. FIG. 1 is a figure showing the concepts of these circuits.

The full bridge type includes switching elements S1 through S4 connected as a bridge, and a power supply V is connected over the bridge. The switching elements S1 and S4, and the switching elements S2 and S3, are alternately turned ON and OFF, and thereby an alternating current flows in the primary winding of the output transformer (refer to Patent Document #1).

In the half bridge type, respective voltage sources C1 and C2 are connected in parallel to switching elements S1 and S2, and a power supply V is connected between the voltage sources C1 and C2. The switching elements S1 and S2 are alternately turned ON and OFF, and thereby an alternating current flows in the primary winding P (refer to Patent Document #2).

In the center tap push-pull type, a power supply V is connected to a center tap of a primary winding P that is connected between switching elements S1 and S2. The switching elements S1 and S2 are alternately turned ON and OFF, and thereby an alternating current flows in the primary winding P (refer to Patent Document #3).

PRIOR ART DOCUMENTS

Patent Documents

Patent Document #1: Japanese Laid-Open Patent Publication 2007-151225.
Patent Document #2: Japanese Laid-Open Patent Publication 2005-279774.
Patent Document #3: Japanese Laid-Open Patent Publication 2001-112253.

DISCLOSURE OF INVENTION

Problems to be Solved by the Invention

However, the various inverter circuits described above suffer from the following inconvenient features.
(1) The Full Bridge Type
Since four switching elements are used, the cost becomes high.
(2) The Half Bridge Type
While two switching elements suffice, the currents that flow in each of these switching elements S1 and S2 and in the primary winding P are twice as great, as compared with the full bridge type or the center tap push-pull type. Due to this, it is not possible to avoid increase in the sizes of the switching elements and of the transformer, or high cost thereof.

(3) The Center Tap Push-Pull Type
Two switching elements suffice, and the currents that flow in each of these switching elements S1 and S2 and in the primary winding P are the same as in the full bridge type, and do not become greater. However, since the power supply V is connected to the center tap of the primary winding P, accordingly a leakage inductance is interposed between the combination of the left and right sides of the winding P. Due to this, the surge voltage that is generated when the first switching element goes to OFF is clamped, via the leakage inductance described above, by a free wheel diode that is connected to the second switching element. Since the leakage inductance described above is present, it is not possible to perform perfect clamping, and there is thus the inconvenience that an excessively great surge voltage is applied to the first switching element.

An object of this invention is to provide a DC-DC converter circuit for which two switching elements suffice, with which the values of the currents flowing in the switching elements are low, and with which no excessively great surge voltages are applied to the switching elements. Moreover, another object of this invention is to provide a DC-DC converter circuit in which a regeneration circuit that regenerates the charge stored in a snubber capacitor to a power source can be built at a low cost.

Means for Solving the Problems

The inverter circuit provided within the DC-DC converter circuit according to the present invention has a structure as shown on the rightmost side of FIG. 1. As switching elements, this inverter circuit has a first switching element S1 and a second switching element S2. These switching elements consist of semiconductor switching elements, and may be, for example, IGBTs (insulated gate bipolar transistors) or MOSFETs. Moreover, this inverter circuit includes an output transformer that has a first primary winding P1 connected in series between the positive electrode sides of said first switching element S1 and said second switching element S2, a second primary winding P2 connected in series between their negative electrode sides, and also a secondary winding for obtaining an output voltage. Furthermore, this inverter circuit includes two voltage sources. The first voltage source C1 is connected between a first connection point at which said first primary winding P1 s connected to said second switching element S2 and said first switching element S1. Due to this, the first voltage source C1 applies a voltage to said first switching element S1 via said first primary winding P1. And the second voltage source C2 is connected between a second connection point at which said first primary winding P1 is connected to said first switching element S2 and said second switching element S2. Due to this, the second voltage source C2 applies a voltage to said first switching element S2 via said first primary winding P1.

A control unit performs control to turn said first switching element S1 and said second switching element S2 alternatingly ON and OFF.

In this specification, an inverter circuit having the structure described above will be termed a "current balanced push-pull type" (Current Balanced P.P.) inverter circuit.

With the structure described above, charging current always flows (i.e. energy is supplied) from the power supply V to the first voltage source C1 and the second voltage source C2. When the first switching element S1 goes to ON, the current component that flows to the first switching element S1 from the first voltage source C1 via the first primary winding 21 and the current component that flows to the first switching element S1 from the second voltage source C2 via the second primary winding P2 are combined, and this combined current flows to the first switching element S1. To put this in another manner, the current that flows in the first switching element S1 is separated (shunted) to the first primary winding P1 and the second primary winding P2.

By providing snubber circuits and regeneration circuits to this inverter circuit, ZVS (Zero Voltage Switching) operation is made possible, and moreover it is possible to reduce the losses. For these snubber circuits, a first snubber circuit is connected in parallel with said first switching element S1 and includes a series circuit of a first snubber diode and a first snubber capacitor, and a second snubber circuit is connected in parallel with said second switching element and includes a series circuit of a second snubber diode and a second snubber capacitor. The operation of the first snubber circuit is as follows.

When the first switching element S1 goes to OFF (i.e. is turned OFF), a charging current flows to the first snubber capacitor due to the operation of a reactance connected to the secondary side of the output transformer (this could also be the leakage inductance of the output transformer), and a surge voltage component is charged into this capacitor. Since the change of the charging voltage at this time gradually rises, the switching operation becomes ZVS operation. On the other hand, when the first switching element S1 goes to ON (i.e. is turned ON), since the current increases with a linear slope due to the current reduction operation of the above described leakage inductance, accordingly the switching operation becomes ZCS (Zero Current Switching) operation. At this time the charge in the first snubber capacitor is not discharged via the first switching element S1, because this is prevented by the first snubber diode, so that it is regenerated to the first voltage source by the first regeneration circuit. It should be understood that, with a conventional snubber circuit in which no regeneration circuit is provided, a snubber resistor Rs1 is connected in parallel with the first snubber capacitor, so that the charge in the snubber capacitor is discharged by this snubber resistor Rs1. This discharge current if is converted to heat by the snubber resistor Rs1 (if×if×Rs1). Due to this, the thermal losses in a conventional snubber circuit to which no regeneration circuit is provided are high, and the efficiency of the inverter circuit becomes low.

In the present invention, no snubber resistor Rs1 is connected; instead, a first regeneration circuit is provided. The charge in the first snubber capacitor is regenerated to the first voltage source by this first regeneration circuit.

This first regeneration circuit is connected between the positive electrode side of said first voltage source and said first snubber capacitor. The first regeneration circuit includes a third switching element, a first reactor that is connected between said third switching element and the positive electrode side of said first voltage source, and a first diode for regeneration that is connected between said third switching element and said first snubber capacitor. Furthermore, the output transformer has a first tertiary winding that is connected to the control terminal of said third switching element. This first tertiary winding and said primary winding are wound so as to sandwich said secondary winding.

Since the first tertiary winding provides its output in synchrony with the ON timing of the first switching element S1, due to this, when the first switching element S1 goes to ON, the charge accumulated in the first snubber capacitor is regenerated to the first voltage source. Due to this regeneration, it is possible for the efficiency of this inverter circuit to be high.

The second snubber circuit and the second regeneration circuit have the same structures as the first snubber circuit and the first regeneration circuit described above. Furthermore, the output transformer has a second tertiary winding that is connected to the control terminal of the fourth switching element.

Effects of the Invention

According to the present invention, two switching elements suffice in an inverter circuit, and moreover the values of the currents flowing in these switching elements are reduced; and, furthermore, no excessively great surge voltages are applied to the switching elements. Yet further, ZVS operation of the switching elements is made possible by connecting the regeneration circuits to the snubber circuits, and moreover it is possible to reduce the losses. Even further, since timing control by a control circuit for turning the switching elements of the regeneration circuits ON is unnecessary, accordingly it is possible to provide regeneration circuits that regenerate the charges in the snubber capacitors to the power supplies at low cost.

BEST MODE FOR CARRYING OUT THE INVENTION

Figure 1:
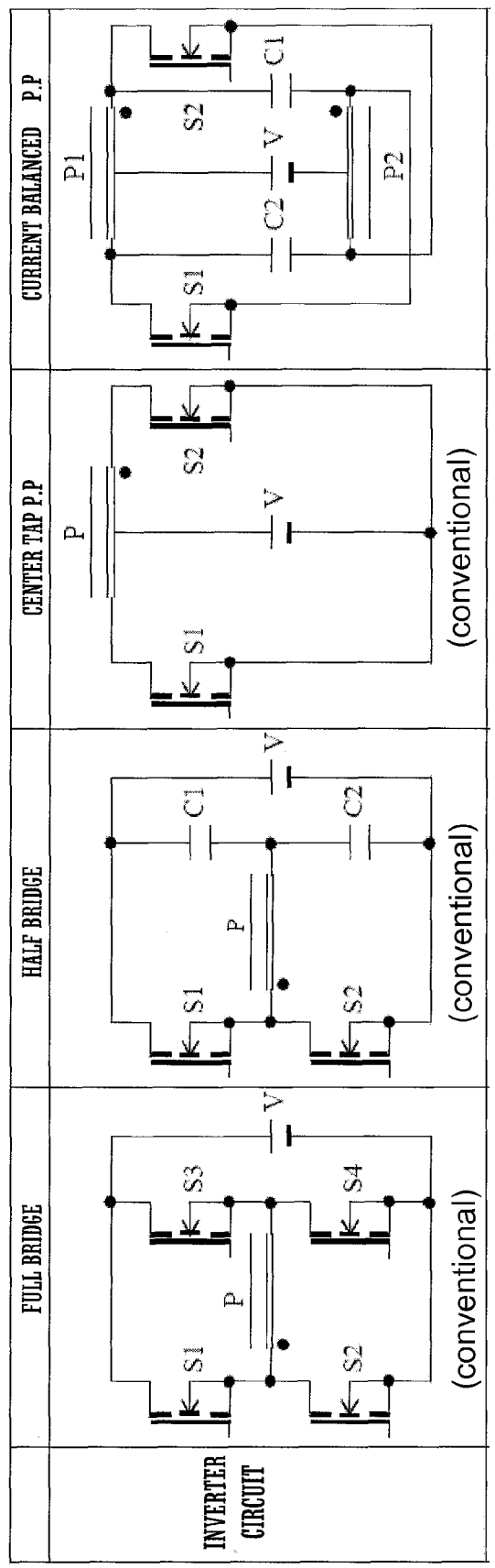
FIG. 1 is a conceptual figure showing inverter circuits of the full bridge type, the half bridge type, the center tap push-pull type, and the current balanced push-pull type.
Figure 2:
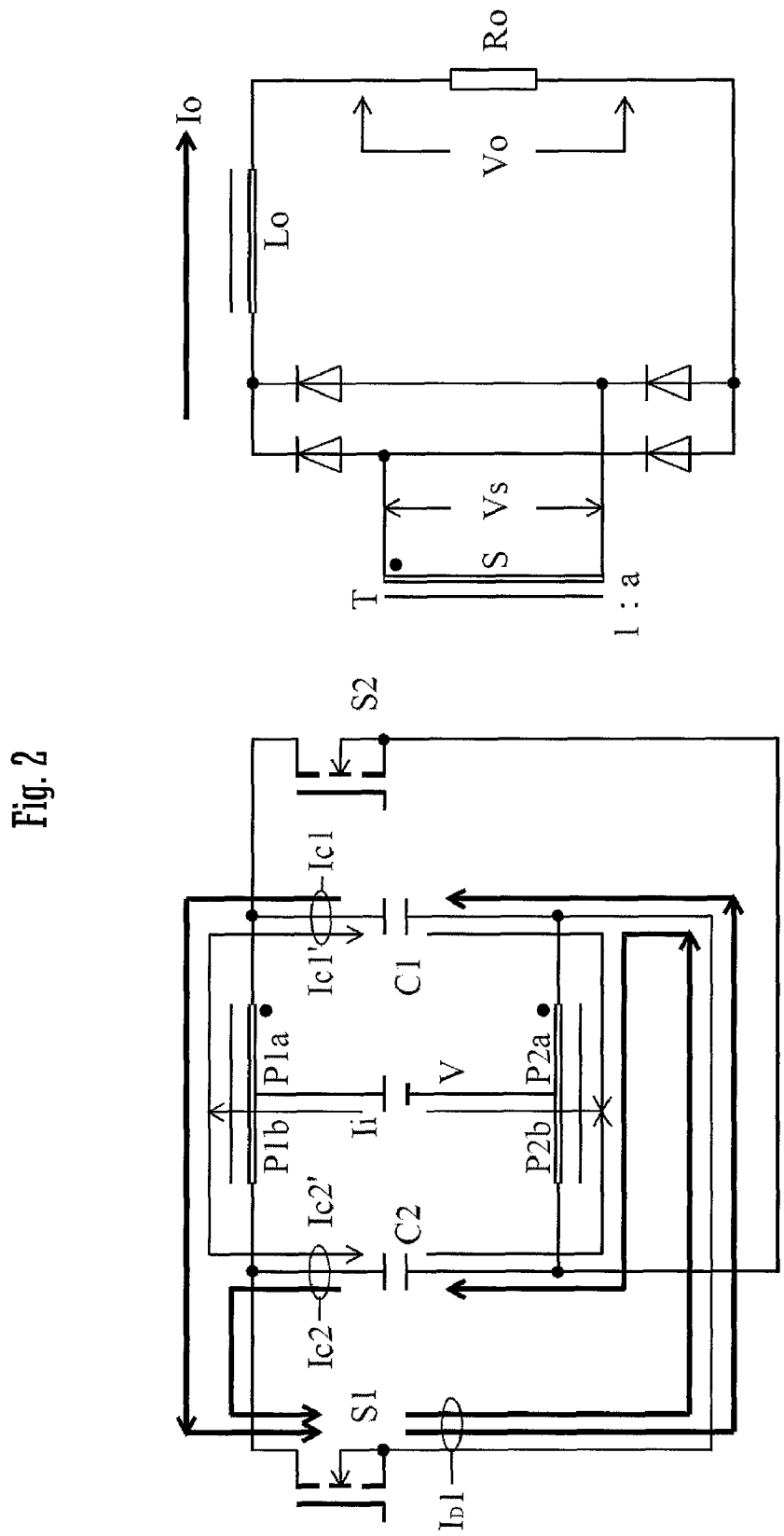
FIG. 2 is a basic structural diagram of a DC-DC converter circuit that uses a current balanced push-pull type inverter circuit.

FIG. 2 is a basic structural diagram for the current balanced push-pull type DC-DC converter circuit of the present invention.

By being built on the primary side of the transformer T as a current balanced push-pull type inverter circuit, and moreover by being built on the secondary side as a rectification circuit, this circuit is, overall, built as a DC-DC converter circuit.

This DC-DC converter circuit comprises a first switching element S1, a second switching element S2, and an output transformer T that comprises a first primary winding P1 connected in series between the positive electrode sides of the first switching element S1 and the second switching element S2, a second primary winding P2 connected in series between the negative electrode sides of the first switching element S1 and the second switching element S2, and a secondary winding for obtaining an output voltage.

Furthermore, this DC-DC converter circuit comprises: a capacitor C1 connected between a first connection point A1 at which the first primary winding P1 is connected to the second switching element S2 and the first switching element S1, that applies a voltage to the first switching element S1 via the first primary winding P1, thus constituting a first voltage source; a capacitor C2 connected between a second connection point A2 at which the first primary winding P1 is connected to the first switching element S1 and the second switching element S2, that applies a voltage to the second switching element S1 via the first primary winding P1, thus constituting a second voltage source; and a power supply V connected between a center tap on the first primary winding P1 and a center tap on the second primary winding P2, that supplies energy to the capacitors C1 and C2 via the first primary winding P1 and the second primary winding P2.

Rectification diodes connected in a bridge are connected to the secondary side winding of the output transformer T, and moreover a reactor $L_0$ for smoothing is connected to these rectification diodes.

The first switching element S1 and the second switching element S2 are turned alternatingly ON and OFF by a control unit (not shown in the figures).

With the DC-DC converter circuit described above, when the first switching element S1 goes to ON, a current $I_D1$ flows in the first primary winding P1 in the leftward direction from the capacitor C1; and, when the second switching element S2 goes to ON, a current $I_D2$ flows in the first primary winding P1 in the rightward direction from the capacitor C2. Thus, by the first switching element S1 and the second switching element S2 being alternatingly turned ON and OFF, an AC output voltage is generated in the secondary winding S, since the currents $I_D1$ and $I_D2$ flow alternatingly in the first primary winding P1.

Figure 3:
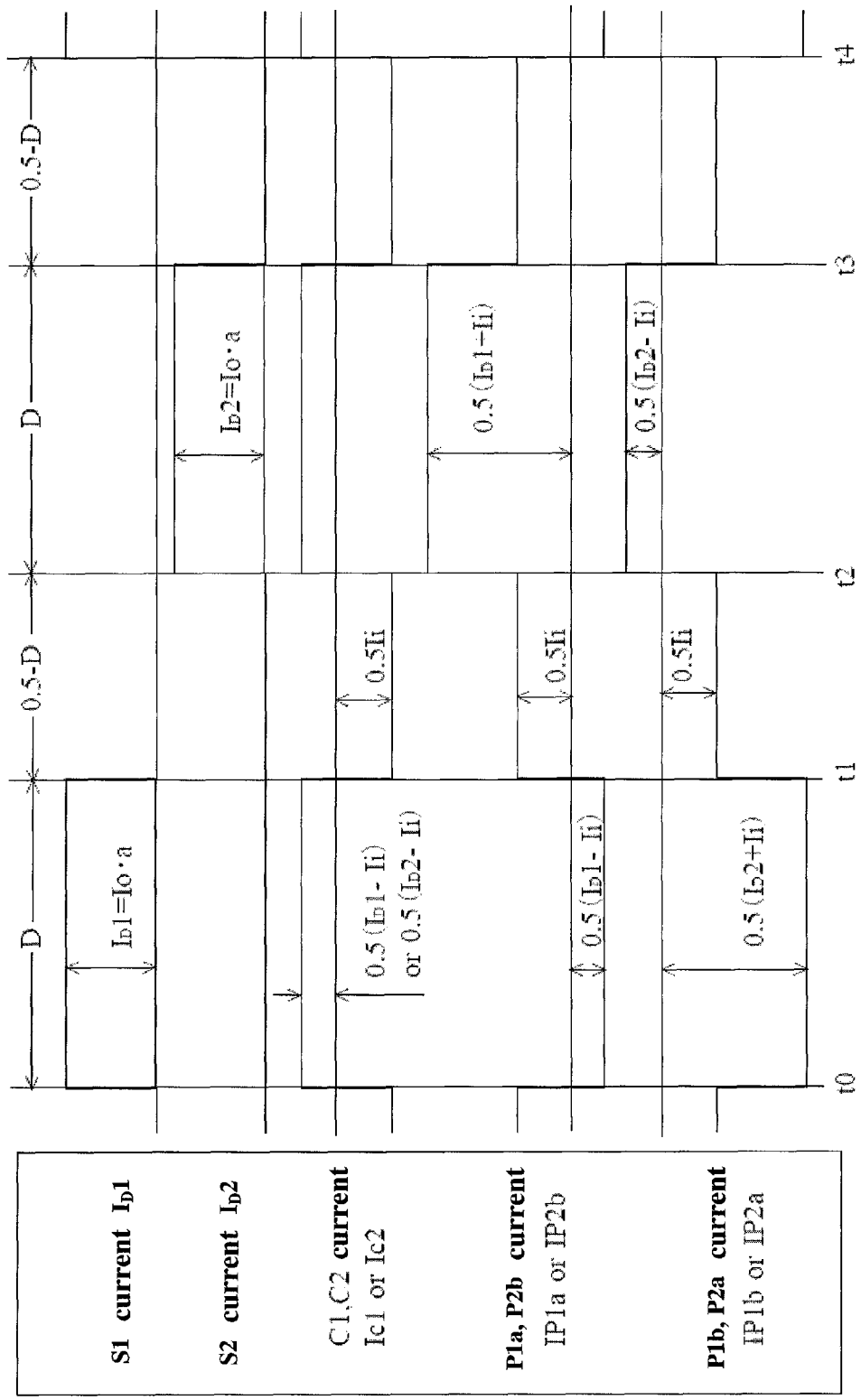
FIG. 3 is a timing chart of the DC-DC converter circuit shown in FIG. 2.

FIG. 3 is a time chart for the DC-DC converter circuit described above. In FIG. 3, the period D is the period in which the first switching element S1 or the second switching element S2 is turned ON. Here, the maximum value of this period D is 0.5. The period (0.5-D) is the inactive period in which both of the switching elements S1 and S2 are turned OFF.

When, by the first switching element S1 going to ON, voltages V are applied to both the first primary winding P1 and the second primary winding P2 by the capacitors C1 and C2 respectively, and an output voltage Vs is generated in the secondary winding S, then an output current $I_o$ flows in the load $R_0$. Due to this, $0.5 I_o \cdot a$ flows in both the primary winding P2 and the primary winding P2 (the winding ratio of the transformer is 1:a). At this time, the element current $I_D1$ in which the current flowing in the switching element S1 from the capacitor C1 and the current flowing in the switching element S1 from the capacitor C2 are combined is $$ID_1 = I_0 \cdot a$$

The output electrical power of each of the (DC) currents Ic1' and Ic2' that charge up the capacitors C1 and C2, divided by the power supply voltage, is half of Ii (i.e. 0.5 Ii). Accordingly, each of the combined currents Ic1 and Ic2 flowing to the capacitors C1 and C2 become equal to the discharge current minus the charging current, $=0.5(I_D-Ii)$.

On the other hand, while the currents that flow in the primary windings P1a and P2b should have the charging currents subtracted, the currents that flow in the primary windings P1b and P2a should have the charging currents added. In other words, $$IP1a, Ip2b = 0.5(I_D1 - Ii)$$

$$IP1b, Ip2a = 0.5(I_D1 + Ii)$$

This current imbalance is no problem. The reason why is that an equilibrium of the average winding current is maintained by turning the switching elements S1 and S2 alternatingly ON and OFF (i.e. by reversing the currents). Accordingly, no particular problem arises with the core of the transformer becoming magnetized.

Furthermore, as seen from the power supply V, the polarities of the windings P1a, P1b, P2a, and P2b are respectively opposite. Due to this, the transformer T is not directly excited by the power supply voltage. Moreover, since the respective charging currents Ic1' and Ic2' that flow into the primary windings P1 and P2 are in opposite directions, accordingly there is no problem of the core becoming magnetized by DC.

With the structure described above, the alternating voltages that are applied to the first primary winding P1 and the second primary winding P2 are equal to the power supply voltage V, and this is the same as in the case of the full bridge type. Moreover, the center taps provided to the first primary winding P1 and the second primary winding P2 are used for energy supply from the power supply V, and both the first primary winding P1 and the second primary winding P2 are employed for output power supply, due to current flowing to the output power supply as shown by the thick lines in FIG. 2. Due to this, it is not the case that each of the windings is unused for one half of the cycle, as in the case of the center tap push-pull type. In other words, it is not necessary to consider the leakage inductance between P1a and P1b and the leakage inductance between P2a and P2b, and during current changeover no surge voltage is generated due thereto. Accordingly it is not necessary, with the objective of preventing surge voltages, to provide close coupling between P1a and P1b, between P2a and P2b, and between P1 and P2. Furthermore, charging currents of 0.5 Ii always flow from the power supply V to the capacitors C1 and C2 via the first primary winding P1 and the second primary winding P2. Since, during this charging, the leakage inductance between those windings P1 and P2 functions as a filter that eliminates the ripple component, accordingly the current Ii supplied from the power supply V becomes continuous DC. Due to this, for the power supply V, it is possible to employ a battery that dislikes ripple component (i.e. whose lifespan characteristic in the presence of ripple is bad), for example a fuel cell. It should be understood that it is necessary for the combination of the first primary winding P1 and the secondary winding S and the combination of the second primary winding P2 and the secondary winding S to be symmetric, since it is necessary to establish good balance in the splitting of current between them.

As has been described above, with the current balanced push-pull type DC-DC converter circuit of this embodiment, there are the beneficial effects that two switching elements are sufficient, that it is sufficient for the current that flows through each of the switching elements to be half as compared with the half bridge type, and moreover that no excessively great surge voltage is applied to the switching elements. Furthermore, for the power supply V, it is possible to employ a battery that dislikes ripple component (i.e. whose lifespan characteristic in the presence of ripple is bad), for example a fuel cell.

Next, a DC-DC converter circuit according to a first embodiment of the present invention will be explained.

Figure 4:
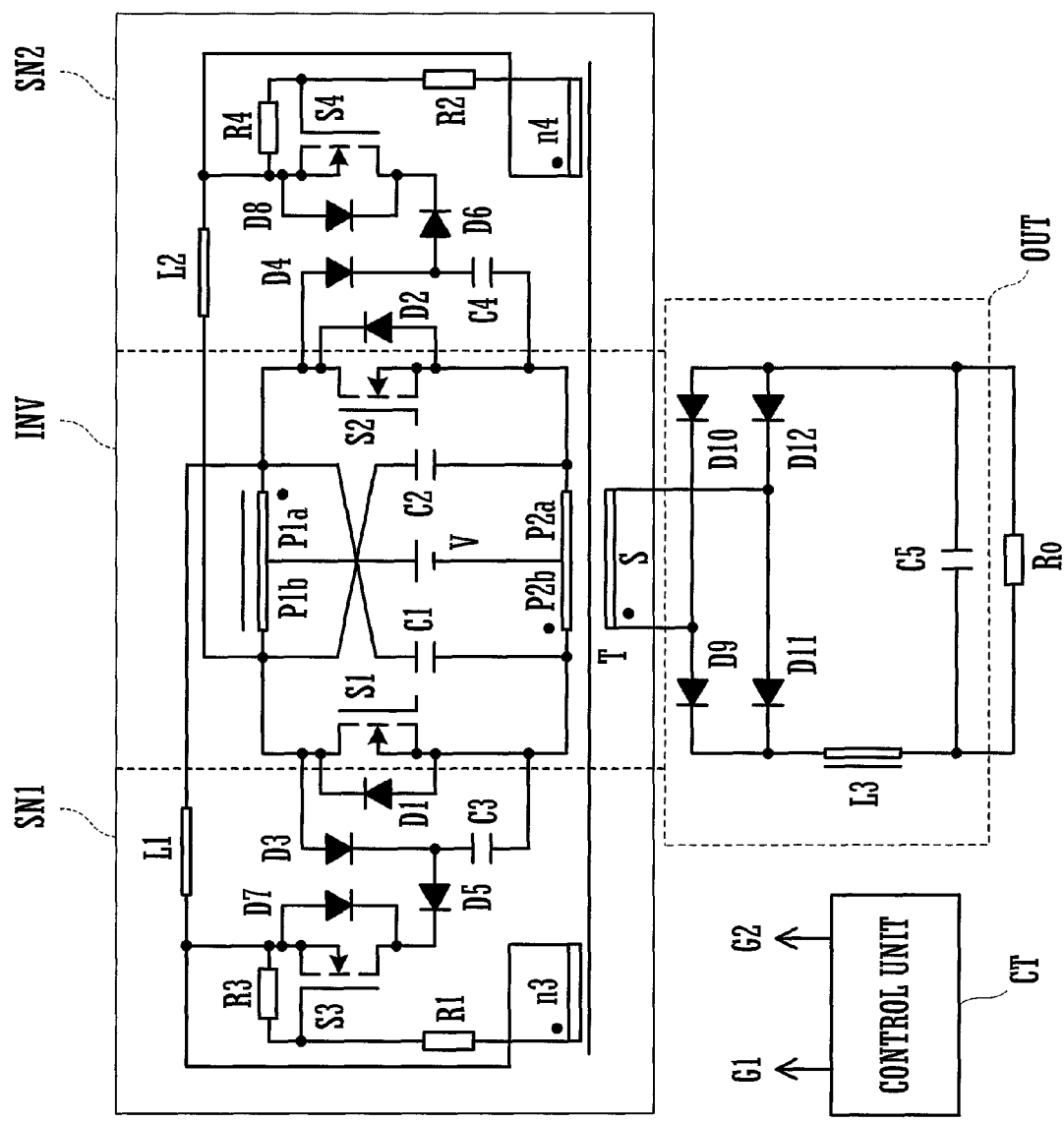
FIG. 4 is a circuit diagram of a current balanced push-pull type DC-DC converter circuit that is an embodiment of the present invention.
Figure 5:
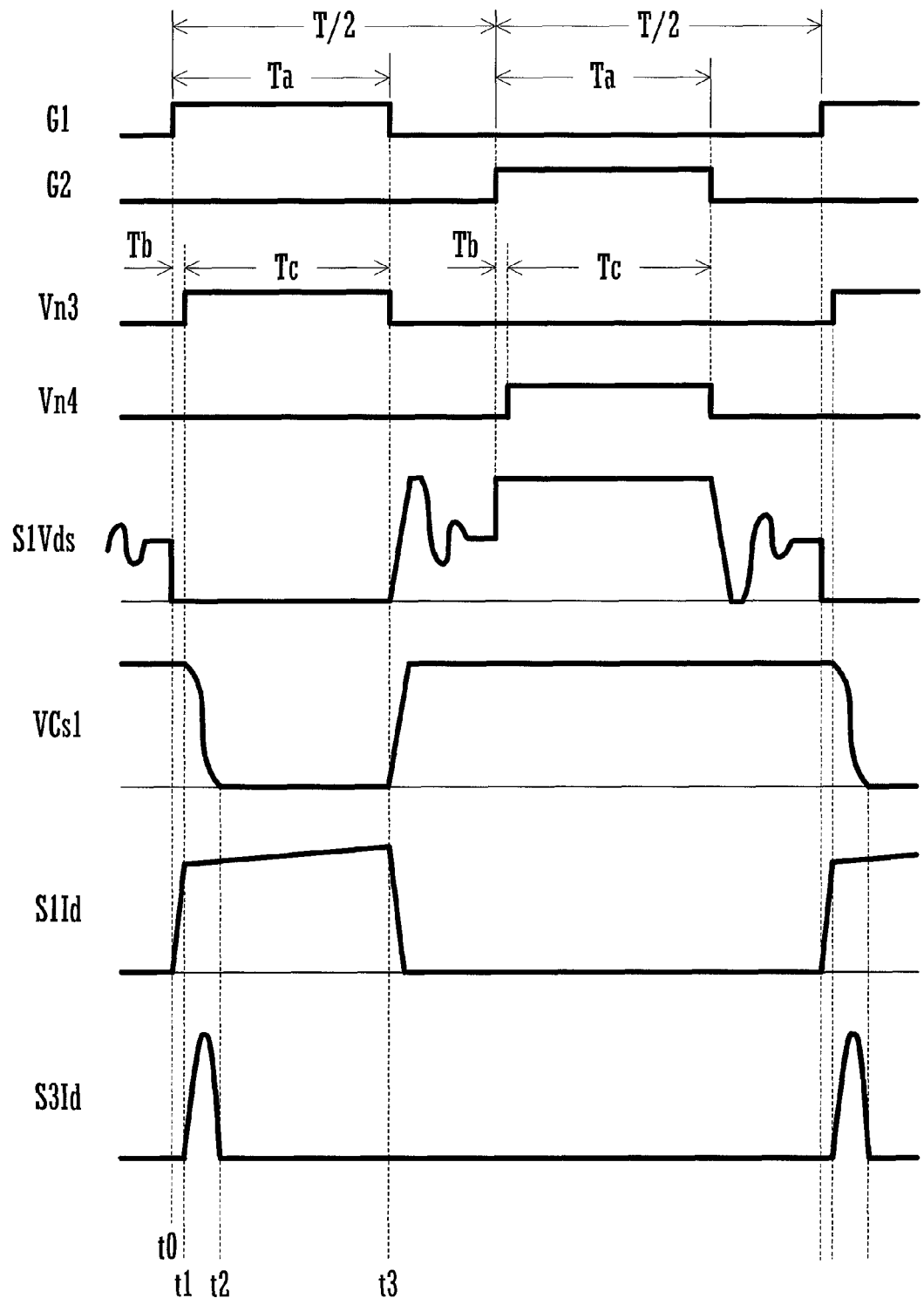
FIG. 5 is a timing chart for the DC-DC converter circuit shown in FIG. 4.

FIG. 4 is a circuit diagram of this DC-DC converter circuit. And FIG. 5 is a time chart.

This converter circuit comprises a current balanced push-pull type inverter circuit INV, an output circuit OUT that rectifies the AC output of this inverter circuit IWS and outputs it to a load, a first regeneration snubber circuit SN1, and a second regeneration snubber circuit SN2.

The inverter circuit INV is the same as the circuit shown in FIG. 2 (in FIGS. 2 and 4, the positions in which the capacitors C1 and C2 are shown are mutually opposite). The first regeneration snubber circuit SN1 is connected to the first switching element S1 of the inverter circuit INV, while the second regeneration snubber circuit SN2 is connected to its second switching element S2. It should be understood that semiconductor switching elements, for example IGBTs or MOSFETs or the like, are used for the first switching element S1 and the second switching element S2.

The output circuit OUT comprises diodes for rectification D9 through D12 that are connected to the secondary winding S of the transformed T, and a reactor L3 for smoothing and a capacitor C5, and a load $R_0$ is connected to this output circuit OUT.

The first regeneration snubber circuit SN1 comprises a first free wheel diode D1 connected in inverse parallel with the switching element S1, and a first snubber circuit connected in parallel with the switching element S1. This first snubber circuit includes a series circuit of a first snubber diode D3 and a first snubber capacitor C3. Moreover, the regeneration snubber circuit SN1 comprises a first regeneration circuit connected between the positive electrode side of the capacitor C1, that constitutes a first voltage source, and the snubber capacitor C3. This first regeneration circuit comprises a third switching element S3, a first reactor L1 connected between the switching element S3 and the positive electrode side of the capacitor C1, and a first diode for regeneration D5 connected between the switching element S3 and the snubber capacitor C3.

Furthermore, the output transformer T comprises a first tertiary winding n3 that is wound adjacent to the secondary winding S so as to be closely coupled to the secondary winding S, and that is connected to the control terminal of the third switching element S3. As will be described hereinafter, for producing this type of winding construction, when winding the primary winding, the secondary winding, and the tertiary winding upon the core, a sandwiched structure is employed in which the secondary winding is sandwiched between the primary winding and the tertiary winding.

The second regeneration snubber circuit SN2 has the same structure as that of the first regeneration snubber circuit SN1. In other words, this second regeneration snubber circuit SN2 comprises a second free wheel diode D2 connected in inverse parallel with the switching element S2, and a second snubber circuit connected in parallel with the switching element S2. This second snubber circuit includes a series circuit of a second snubber diode D4 and a second snubber capacitor C4. Moreover, the regeneration snubber circuit SN2 comprises a second regeneration circuit connected between the positive electrode side of the capacitor C2, that constitutes a second voltage source, and the snubber capacitor C4. This second regeneration circuit comprises a fourth switching element S4, a second reactor L2 connected between the switching element S4 and the positive electrode side of the capacitor C2, and a second diode for regeneration D6 connected between the switching element S4 and the snubber capacitor C4.

Furthermore, the output transformer T comprises a second tertiary winding n4 that is wound adjacent to the secondary winding S so as to be closely coupled to the secondary winding S, and that is connected to the control terminal of the fourth switching element S4.

The converter circuit also comprises a control unit CT, and this control unit CT generates gate signals G1 and G2 for performing the ON and OFF control for the switching elements S1 and S2. These gate signals G1 and G2 are supplied to the gate terminals of the switching elements S1 and S2 respectively.

Next, the operation will be explained with reference to FIG. 5.

The operation of the first regeneration snubber circuit SN1 will now be explained.

Directly before t0, due to the operation of the reactor L3 which is a current source (and that is connected to the secondary side winding S of the transformer T), the diodes for rectification D9 through D12 re in the free wheel state. And when at t0 the switching element S1 goes to ON, due to the current reduction operation of the leakage inductance of the primary windings P1 (P1a and P1b) and P2 (P2a and P2b), the current S1Id flowing in the switching element S1 increases linearly with a constant slope. Due to this, the switching operation becomes ZCS (Zero Current Switching) operation.

Furthermore, when the switching element S1 goes to OFF, the snubber capacitor C3 gradually is charged up by the energy accumulated in the above described leakage inductance. The alteration of the charge potential VC3 of the snubber capacitor C3 in the later half of the charging cycle is determined by the resonant system of the above described leakage inductance and the snubber capacitor C3, and finally is clamped to 2V (the potential of the capacitor C1 is supposed to be V). Due to this, application of surge voltage to the switching element S1 is prevented, and the voltage S1Vds across the two sides of the switching element S1 gradually rises, as shown in FIG. 5. Accordingly, the switching operation becomes ZCVS (Zero Voltage Switching) operation.

When the switching element S1 has gone to OFF, the charge in the snubber capacitor C3 is not consumed by a snubber resistor as in a prior art circuit, but is regenerated to the capacitor C1 that constitutes the first voltage source.

In other words, when the switching element S1 goes to ON, the voltage of the first tertiary winding n3 rises after a current changeover overlap time period Tb, and due to this the switching element S3 is turned to ON. At this time, the positive electrode portion of a regeneration current based upon the electric charge in the snubber capacitor C3 (whose potential is 2V) due to the resonant system of the snubber capacitor C3 and the first reactor L1 flows in the switching element S3, and the electric charge described above is regenerated to the capacitor C1 (at potential V). When the regeneration current (the resonant current) has become zero, all of the charge in the snubber capacitor C3 is regenerated (clearly, this is with the exception of the resonant term), since the potential 2V to which the snubber capacitor C3 is charged is twice the potential V to which the capacitor C1 is charged. It should be understood that, as far as the negative electrode portion is concerned, the snubber capacitor is not re-charged, due to the charging of the regeneration diode D5 being blocked. The period Tc in which the switching element S3 is ON is from t1 to t3. Since this period t1-t3 is greater than or equal to the period t1-t2 until the regeneration current flowing in the resonant system described above becomes zero, accordingly all of the charge in the snubber capacitor C3 is regenerated to the capacitor C1.

In this manner it is possible to enhance the efficiency of this inverter circuit, since the charge in the snubber capacitor C3 is not consumed by a snubber resistor when the switching element S1 goes to ON as is the case with a snubber circuit according to the prior art, but rather is regenerated to the capacitor C1 which constitutes the first voltage source.

The operation of the second regeneration snubber circuit SN2 is the same as that described above.

Figure 6:
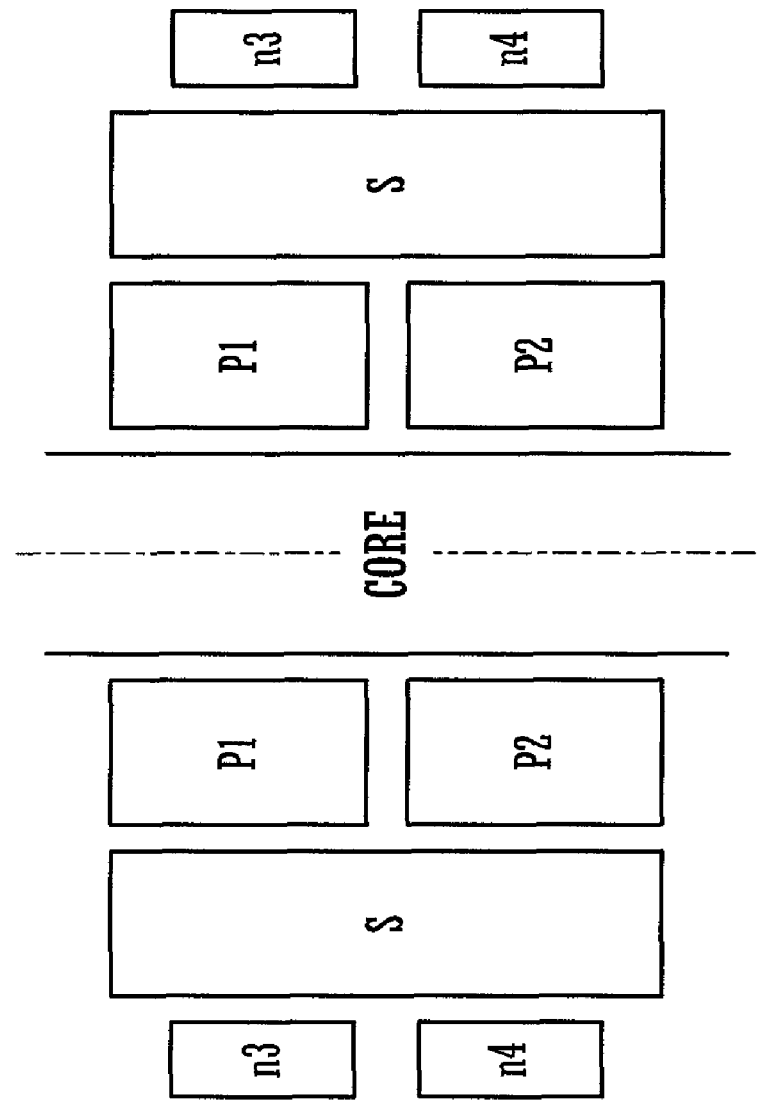
FIG. 6 is a winding construction figure for a transformer T of a first embodiment.

FIG. 6 is a figure showing a winding construction for the transformer T.

From the core at the center of this transformer T going outwards, first the primary windings P1 and P2 are wound upon that core, then the secondary winding S is wound over them, and then the tertiary windings n3 and n4 are further wound upon that secondary winding S. In other words, the tertiary windings n3 and n4 and the primary windings P1 and P2 are wound so as to sandwich the secondary winding S between them. According to this type of winding construction, the tertiary windings n3 and n4 are closely coupled to the secondary winding S, and moreover the tertiary windings n3 and n4 are loosely coupled to the primary windings P1 and P2.

When at t3 in FIG. 5 the ZVS operation of the switching element S1 is performed and the voltage S1Vds between the two ends of the switching element S1 becomes 2V, due to the energy that is accumulated in the reactor L3 from directly thereafter and the floating capacity of the circuit, the voltage between the two ends of the switching element S1 acquires an oscillating waveform (a ringing waveform). However, from t3, due to the energy accumulated in the reactor L3, all of the diodes for rectification D9 through D12 go into the continuous free wheel state, so that the magnetic flux that is generated in the secondary winding S is fixed, and due to this no oscillating waveform is generated in the secondary winding S. Accordingly, no oscillating waveform is generated after the time point t3 in the tertiary windings n3 and n4 which are closely coupled to the secondary winding S. Due to this, the switching elements S3 and S4 do not perform unstable operation due to an oscillating waveform.

In this manner, with the DC-DC converter circuit described above, ZVS operation of the switching elements is made possible by connecting the snubber circuits and the regeneration circuits, and moreover it is possible to reduce the losses. Furthermore, since the switching elements S3 and S4 of the regeneration circuits are turned ON by the tertiary windings n3 and n4 in synchrony with the switching elements S1 and S2, accordingly it is unnecessary to provide any circuitry for controlling these switching elements S3 and S4. Yet further, since tinting control for turning on the tertiary windings n3 and n4 is unnecessary, accordingly it is possible to build the regeneration circuits that regenerate the charges in the snubber capacitors to the power supply at a low cost. Even further, since the tertiary windings n3 and n4 are closely coupled to the secondary winding S while the tertiary windings n3 and n4 are loosely coupled to the primary windings P1 and P2, due to the secondary winding S being sandwiched between the tertiary windings n3 and n4 and the primary windings P1 and P2, accordingly no voltage having an oscillating waveform is generated in the tertiary windings n3 and n4, even if a voltage having an oscillating waveform is generated in the primary windings P1 and P2.

Figure 7:
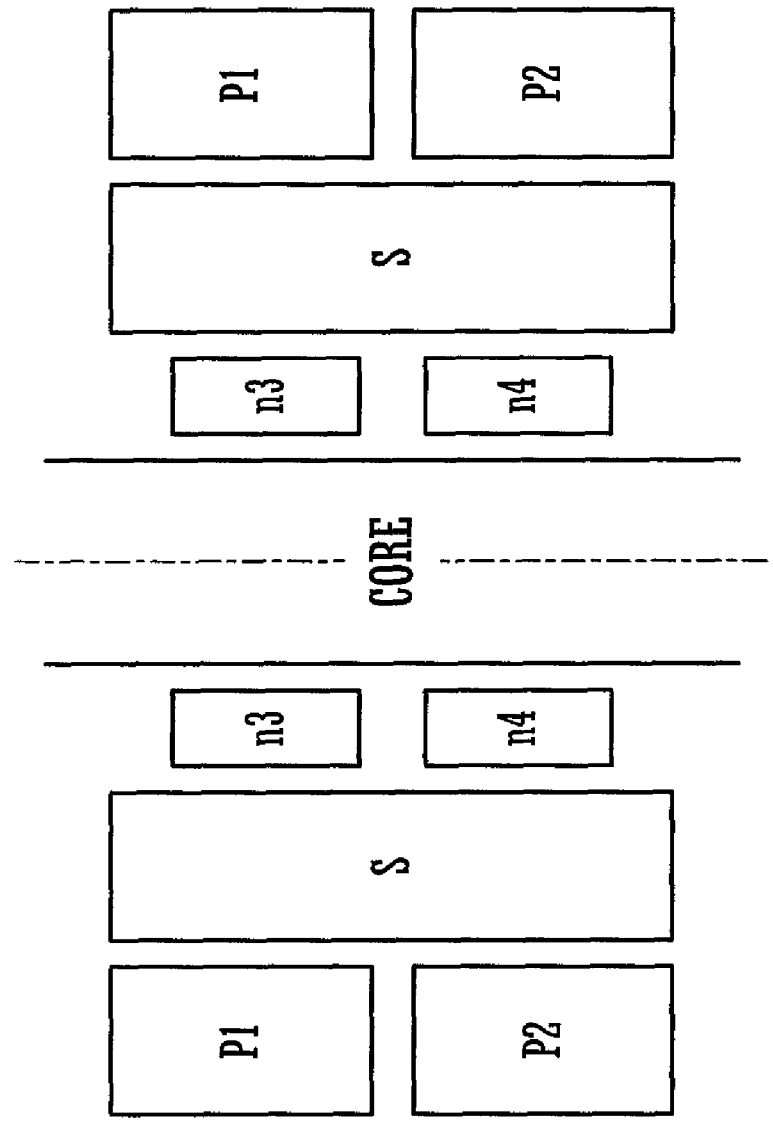
FIG. 7 is a winding construction figure for a transformer T of a second embodiment.
Figure 8:
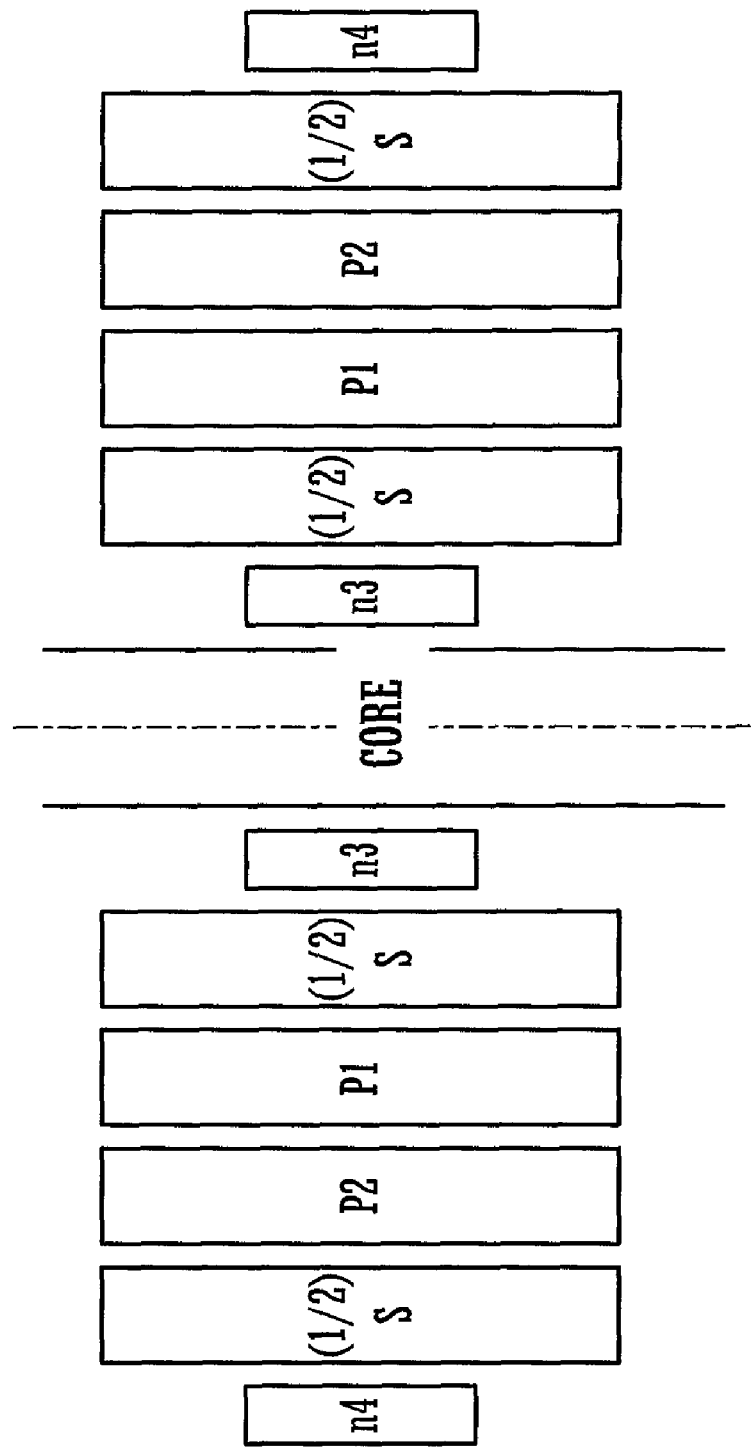
FIG. 8 is a winding construction figure for a transformer T of a third embodiment.
Figure 9:
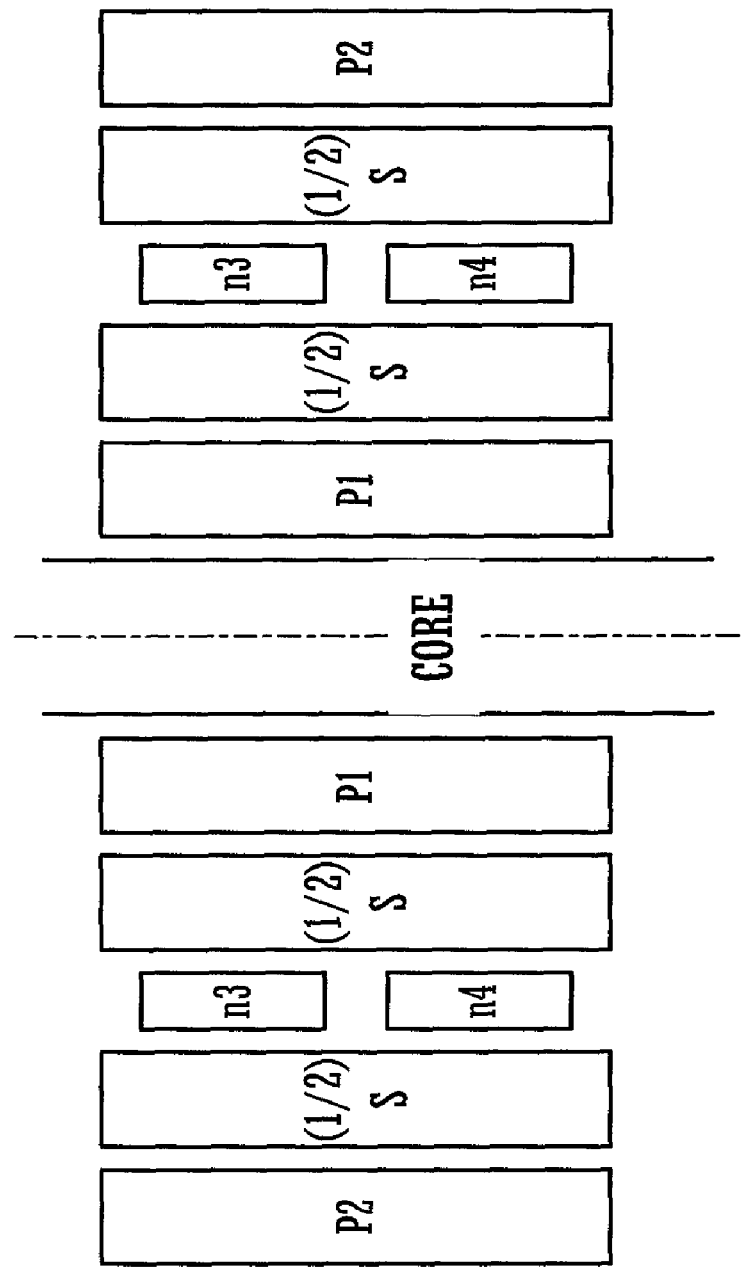
FIG. 9 is a winding construction figure for a transformer T of a fourth embodiment.

FIGS. 7 through 9 show other examples of winding constructions for the transformer T.

With the transformer construction of FIG. 7, the tertiary windings n3 and n4 are wound innermost upon the core, while the primary windings are wound on the most outward layer. With the transformer construction of FIG. 8, the secondary winding S is divided into two portions, and, sequentially from the innermost layer upon the core, there are wound: the first tertiary winding n3→the first portion of the secondary winding S→the first primary winding P1→the second primary winding P2 the second portion of the secondary winding S→the second tertiary winding n4. And, with the transformer construction of FIG. 9, the secondary winding S is again divided into two portions, and, sequentially from the innermost layer upon the core, there are wound: the first primary winding P1→the first portion of the secondary winding S→the first and second tertiary windings n3 and n4→the second portion of the secondary winding S→the second primary winding P2.

With the above described variant transformer constructions as well, the first and second primary windings n3 and n4 are in a close coupled positional relationship with respect to the secondary winding S, while they are in a loosely coupled positional relationship with respect to the primary windings P1 and P2.

Figure 10:
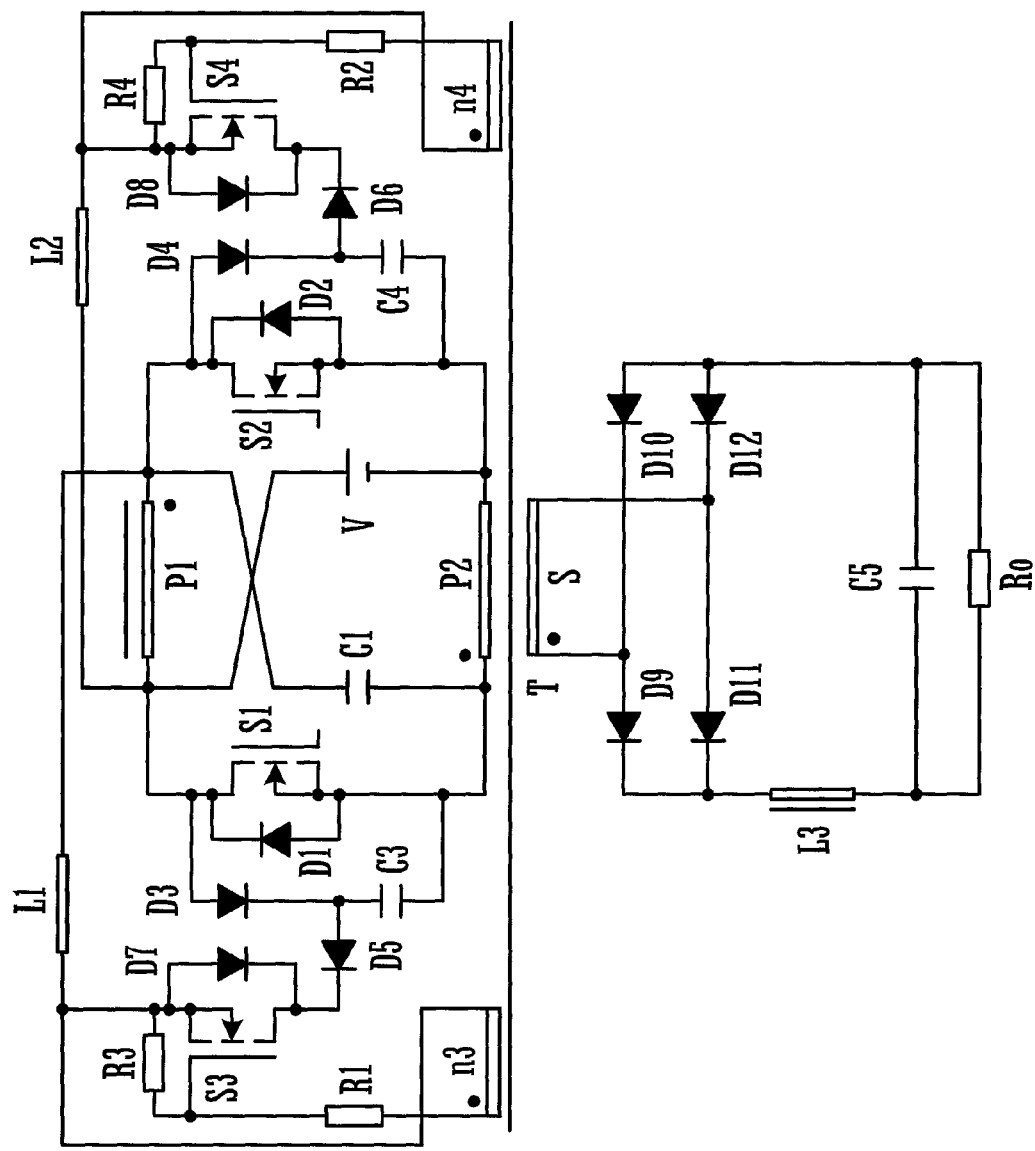
FIG. 10 is a circuit diagram of a current balanced push-pull type DC-DC converter circuit that is another embodiment of the present invention.

FIG. 10 shows a DC-DC converter circuit that is another embodiment of the present invention.

The points of difference between this converter circuit and the converter circuit of FIG. 4 are that the power supply V is connected instead of the capacitor C2, and that the power supply V is not connected between the center tap of the first primary winding P1 and the center tap of the second primary winding P2. This type of structure also operates in a similar manner to the FIG. 4 structure.

EXPLANATION OF REFERENCE NUMBERS

C1: capacitor, that constitutes a first voltage source
C2: capacitor, that constitutes a second voltage source
V: power supply
S1: first switching element
S2: second switching element
S3: third switching element
S4: fourth switching element
P1: first primary winding
P2: second primary winding
n3: first tertiary winding
n4: second tertiary winding
INV: inverter circuit
SN1: first regeneration snubber circuit
SN2: second regeneration snubber circuit
OUT: output circuit

The invention claimed is:
1. A DC-DC converter circuit, comprising:
a first switching element;
a second switching element;
an output transformer comprising a first primary winding connected in series between the positive electrode sides of said first switching element and said second switching element and a second primary winding connected in series between the negative electrode sides of those switching elements, and further comprising a secondary winding for obtaining an output voltage;
a rectification diode circuit connected to said secondary winding of said output transformer;
a first voltage source, connected between a first connection point at which said first primary winding is connected to said second switching element and said first switching element, and that applies a voltage to said first switching element via said first primary winding;
a second voltage source, connected between a second connection point at which said first primary winding is connected to said first switching element and said second switching element, and that applies a voltage to said second switching element via said first primary winding;

a control unit that turns said first switching element and said second switching element alternatingly ON and OFF;

a first free wheel diode connected in inverse parallel with said first switching element;

a first snubber circuit, connected in parallel with said first switching element, and including a series circuit of a first snubber diode and a first snubber capacitor;

a first regeneration circuit connected between the positive electrode side of said first voltage source and said first snubber capacitor;

said first regeneration circuit comprising a third switching element, a first reactor connected between said third switching element and the positive electrode side of said first voltage source, and a first diode for regeneration connected between said third switching element and said first snubber capacitor;

said output transformer comprising a first tertiary winding connected to a control terminal of said third switching element;

a second free wheel diode connected in inverse parallel with said second switching element;

a second snubber circuit, connected in parallel with said second switching element, and including a series circuit of a second snubber diode and a second snubber capacitor;

a second regeneration circuit connected between the positive electrode side of said second voltage source and said second snubber capacitor;

said second regeneration circuit comprising a fourth switching element, a second reactor connected between said fourth switching element and the positive electrode side of said second voltage source, and a second diode for regeneration connected between said fourth switching element and said second snubber capacitor; and said output transformer comprising a second tertiary winding connected to a control terminal of said fourth switching element.

2. A DC-DC converter circuit according to claim 1, wherein said first and second tertiary windings and primary windings are wound so as to sandwich said secondary winding between them.

3. A DC-DC converter circuit according to claim 2, further comprising a power supply, connected between a center tap of said first primary winding and a center tap of said second primary winding, that supplies energy to said first and second voltage sources via said first primary winding and said second primary winding.

4. A DC-DC converter circuit according to claim 1, wherein either one or both of said first voltage source and said second voltage source is constituted by a power supply.

* * * * *